United States Patent [19]

Guzik et al.

[11] Patent Number: 4,627,288

[45] Date of Patent: Dec. 9, 1986

[54] BEARING UNLOADING MECHANISM FOR DISC CLAMPING UNIT

[75] Inventors: Nahum Guzik, Mountain View; John L. Guerini, San Jose; Semyon Sherstinsky, San Francisco, all of Calif.

[73] Assignee: Guzik Technical Enterprises, Sunnyvale, Calif.

[21] Appl. No.: 764,413

[22] Filed: Aug. 12, 1985

[51] Int. Cl.[4] ............................................. G01M 1/19
[52] U.S. Cl. ..................................... 73/432.1; 360/97
[58] Field of Search ...................... 73/856, 857, 432 A, 73/432 R; 324/210, 212; 384/304, 518, 535, 563, 581; 360/97

[56] References Cited

U.S. PATENT DOCUMENTS

| | | | |
|---|---|---|---|
| 2,416,886 | 3/1947 | Stevens | 384/535 |
| 3,838,460 | 9/1974 | Stewart | 360/97 |
| 3,984,763 | 10/1976 | Koester et al. | 324/212 |

*Primary Examiner*—Stewart J. Levy
*Assistant Examiner*—Robert R. Raevis
*Attorney, Agent, or Firm*—David Pressman

[57] ABSTRACT

A bearing unloading mechanism for a disc clamping unit utilized in rigid disc certifiers or testers comprises a hollow spindle (12) containing a pulling rod (20) which slides in the spindle. The upper end of the pulling rod carries a clamping element (26) for clamping a disc (D) to be tested or certified. There is a first compression spring (32) arranged between a flange (30) at the lower end of rod (20) and second compression springs (56) between stationary casing (18) and a moveable casing (48) which is attached to a pneumatic cylinder (40), solenoid, or any other linear actuator. When the actuator is energized, the moveable casing moves down, compressing the second springs until the moveable casing comes into contact with an abutment flange (58) of the spindle. At this point the device continues to move the rod connected to the clamp up to the unclamped position. Since the device is applying an equal downward force, as well as an upward force, there is no force applied to the internal components of the bearings.

13 Claims, 2 Drawing Figures

BEARING UNLOADING MECHANISM FOR DISC CLAMPING UNIT

FIELD OF THE INVENTION

The present invention relates to rigid disc test equipment, particularly to bearing unloading mechanisms for automatic disc clamping units used in disc testers, disc certifiers, etc.

DESCRIPTION OF PRIOR ART

Rigid disc testers or certifiers are designed to test and classify rigid magnetic media, such as discs. In such devices, a rigid disc is normally clamped for testing in a clamping mechanism which rotates the disc with a high freedom from radial and axial wobble close to a measuring head. The results of the measurements are processed by a microcomputer and shown on a CRT.

Known in the art is a disc tester which employs a conventional clamping mechanism. This tester is made by Adelphi Associates, Inc. of Fremont, CA, and is sold under the designation "Rigidingle Disc Tester", Model RD008. This mechanism has ball bearings in inner and outer raceways. Each time a disc is clamped in this mechanism, a force is applied to the raceways and the balls.

Since under production conditions such loading cycles are repeated many times, this force very quickly destroys the bearings by a so-called "brinelling" effect, i.e., a deterioration of the surface due to the pressure of the balls on the edge of the raceway. This results in bearing runout or wobble and impairs the accuracy of testing.

OBJECTS AND ADVANTAGES OF THE INVENTION

It is accordingly an object of the present invention to provide an improved and reliable bearing unloading mechanism for disc clamping units used in rigid disc testers or certifiers. Another object of the invention is to unload the spindle bearings of the disc clamping mechanism and thereby improve the accuracy, efficiency, and reliability of the tester and prolong its service life. Still further objects and advantages of the invention will become apparent from a consideration of the ensuing description and drawings.

REFERENCE NUMERALS USED IN DESCRIPTION AND DRAWINGS

10—disc clamping mechanism
12—hollow spindle
14, 16—bearings
18—stationary casing
20—pulling rod
22, 24—guide openings
26—dome-like rubber clamp
28—disc support
30—flange
32—main compression spring
34—central hole of disc
40—actuator
42—cylinder
44—piston
46—piston rod
48—piston rod
50—inner flange
52—guide hole
54—guide pin
56—small spring
58—abutment flange

DESCRIPTION

Figures 1, 2:
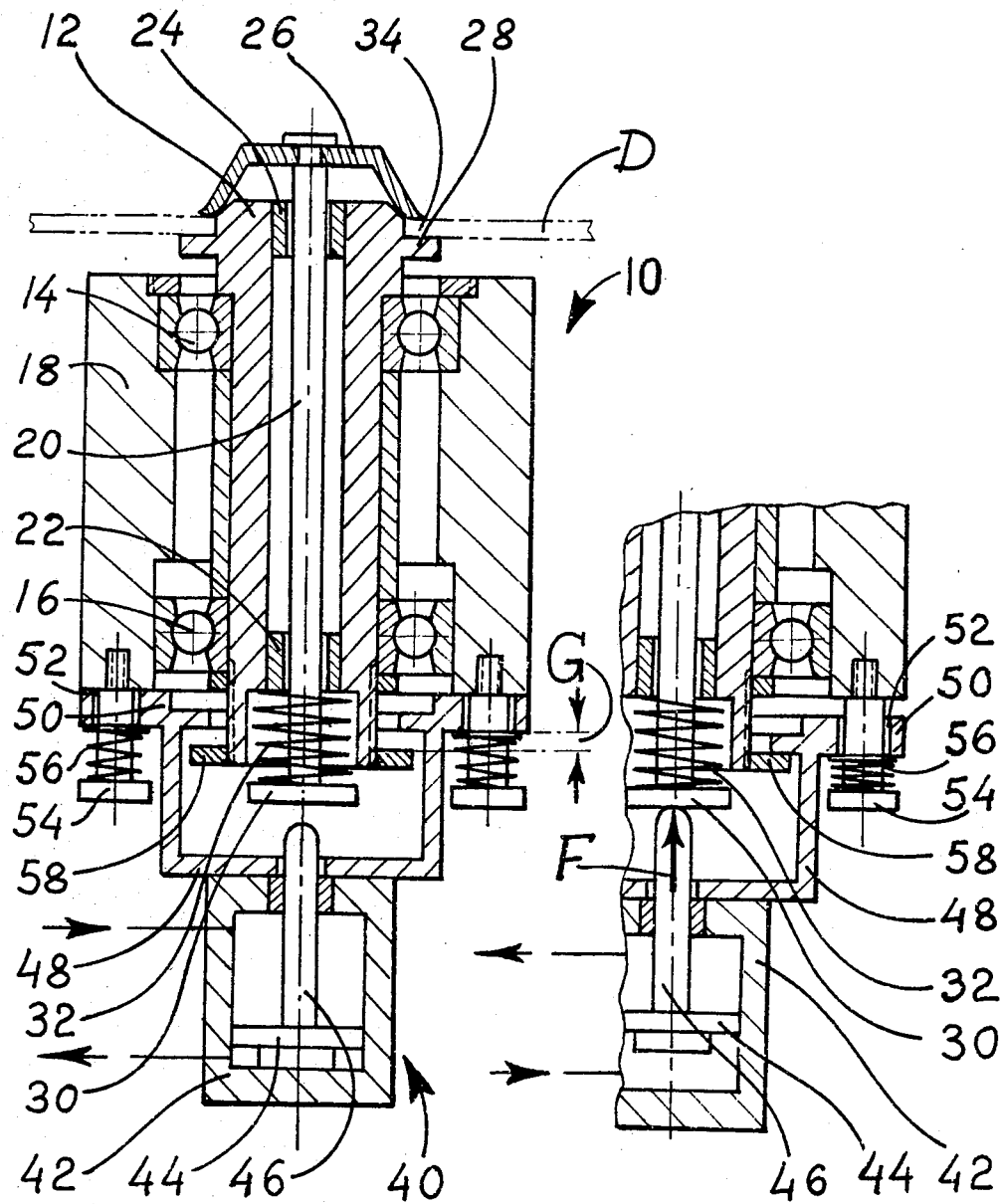
FIG. 1 is a schematic longitudinal sectional view of a disc clamping mechanism unit employing the bearing unloading mechanism of the invention; the mechanism is shown with the disc clamped.
FIG. 2 is a partial view of the same mechanism with the disc unclamped.

A disc clamping mechanism (FIG. 1), in accordance with the invention is designated generally by reference numeral 10. Mechanism 10 has a hollow spindle 12 rotatably mounted on bearings 14 and 16 in a stationary casing 18 of the disc tester or certifier.

A pulling rod 20 is arranged axially within spindle 12 so that it can slide in a vertical direction in guide openings 22 and 24 of the spindle. The upper end of rod 20 projects from spindle 12 and carries a dome-like rubber clamp 26. The lower end of clamp 26 serves to press a disc D to be tested to the surface of a disc support 28 rigidly mounted at the upper end of spindle 12.

The lower end of rod 20 has a flange 30 and a main compression spring 32 positioned between flange 30 and the lower end of spindle 12. As a result, main spring 32 normally tends to expand against flange 30 and thereby pull or press rubber clamp 26 down against the surface of disc D or disc support 28. When clamp 26 is so pressed, it deforms, causing it to expand radially outward beyond the edges of a central hole 34 of disc D. This holds disc D rigidly against support 28.

The device is provided with an actuator 40 (FIGS. 1 and 2) which may be of any suitable type (mechanical, electromagnetic, hydraulic, pneumatic, etc.). Actuator 40 applies an axial, upward force F to rod 20, and when not contacting rod 20, it allows spring 32 to push rod 20 downwardly.

For the purpose of convenience, the actuator will be further illustrated and described as a pneumatic device consisting of a pneumatic cylinder 42, a piston 44 which slides within cylinder 42, and a piston rod 46, the upper end of which can push upwardly against flange 30 of pulling rod 20. The pneumatic actuator is also provided with a suitable valve mechanism (not shown) which displaces piston 44 in an upward or downward direction, depending on whether it is necessary to unclamp or clamp the disc.

Cylinder 42 of actuator 40 is rigidly attached to a movable bracket 48 which has a flange 50 which has inner and outer portions, as shown. Guide holes 52 are formed in the outward portion of flange 50 for guide pins 54. Pins 54 are rigidly attached to stationary casing 18 and captivate small compression springs 56 positioned between the heads of pins 54 and flange 50. Small springs 56 are substantially weaker than main spring 32 but they are strong enough to hold the suspended system consisting of cylinder 42 and movable bracket 48 up against casing 18.

An abutment flange 58 is formed on casing 18. Flange 58 is located below the inner portion of flange 50 of movable bracket 48 so that both flanges can come into contact.

OPERATION OF THE DEVICE

The device operates in the following manner: In a normal, inoperative position (i.e., without a disc and without application of force from actuator 40), a control valve admits compressed air to the cylinder cavity above piston 44. The pressure from this air pushes piston 44 and its rod 46 down, allowing spring 32 to push rod 20 downward to press dome-like rubber clamp 26 to disc support 28. Flange 50 of movable bracket 48 is in its upper position under the effect of small springs 56. Thus a gap G is maintained between the inner portion of flange 50 and abutment flange 58 of casing 18. In this position, piston rod 46 of actuator 40 does not apply a force to flange 30 of rod 20.

When disc D is to be installed for testing or certification, actuator 40 is switched to its other position, i.e., compressed air is admitted to cylinder 42 below piston 44 so that piston 44 is forced upward until the upper end of its piston rod 46 comes into contact with flange 30. Since main spring 32 is substantially stronger than small springs 56, further movement of piston rod 46 will be discontinued and pressure from the air below piston 44 will create a reaction force which is applied to cylinder 42. As a result, cylinder 42, together with moveable bracket 48, will move downward, overcoming the force of springs 56. This movement of bracket 48 will continue until the inner portion of flange 50 contacts abutment flange 58.

At this moment, moveable bracket 48 and cylinder 42 will stop. However the continued pressure in cylinder 42 will cause piston rod 46 to move upward. This pressure will overcome the force of main spring 32 and raise rod 20, together with rubber clamp 26. When rubber clamp 26 moves away from the surface of disc support 28, its outer ends will move radially inwardly. Thus the outer diameter of clamp 26 will become smaller than central opening of disc D. This allows disc D, to be freely inserted over clamp 26.

When the inner portion of flange 50 contacts abutment flange 58, a closed or floating system is formed so that external axial force F developed by actuator 40 will not be transmitted to bearings 14 and 16, but rather will be confined within the closed system. Thus during multiple cycles of disc insersion, bearings are left unloaded and their accuracy and efficiency are maintained unchanged.

After insertion of disc D, actuator 40 is released by switching the control valve to displace air from the cylinder. As a result, air is admitted to the upper chamber of cylinder 42, piston 44 is pushed downward, its piston rod 46 is retracted from flange 30, allowing spring 32 to expand. Thereupon clamp 26 returns to its lower position. At the same time, springs 56 also tend to expand, causing the inner portion of flange 50 to separate from abutment flange 58. This restores gap G between both flanges. When the clamp rests upon disc D, the clamp deforms radially outwardly beyond edges of the central hole of disc D, thus firmly clamping disc D for testing.

CONCLUSION, RAMIFICATIONS

Thus it is seen that the present invention provides an improved and reliable bearing unloading mechanism for disc clamping units used in rigid disc testers and certifiers. The device of the invention unloads the spindle bearings of the disc clamping mechanism and thereby improves the accuracy, efficiency, and reliability of the tester and prolongs its life.

We have described the invention in the form of a perferred embodiment. However, those skilled in the art will easily envisage many other modifications and applications. For example, a lever mechanism, a stepper, gear motor, solenoid, hydraulic mechanism, etc. can be used as an actuator instead of a pneumatic cylinder. A clamp with jaws moveable radially by a lever linkage, wedge, or cam mechanism can be utilized for pressing the disc to the disc support. Furthermore, the device of the invention can be utilized for applications other than disc testers or certifiers, but for axial unloading of bearings in any suitable clamping device. Tension springs with a suitable modification of engaging elements of the mechanism can be utilized instead of compression springs. Therefore the scope of the invention should be determined not only by the example given, but rather by the appended claims and their legal equivalents.

What is claimed is:

1. A bearing unloading mechanism for a disc clamping unit, comprising:
   stationary casing means;
   hollow spindle means rotatably mounted in said stationary casing means;
   disc support means mounted on said spindle means;
   a disc clamping element;
   a longitudinal element slidingly arranged in said hollow spindle means and attached to said disc clamping element;
   first resilient means mounted between said hollow spindle means and said longitudinal element, said first resilient means normally urging said first resilient means in a direction which urges said attached disc clamping element to said disc support means;
   moveable casing means;
   an actuator rigidly attached to said moveable casing means, said actuator having a working element positioned to engage said longitudinal element so that when said actuator is in an actuated position, it overcomes the force of said first resilient means and releases said disc clamping element from said support means; and
   moveable connection means moveably connecting said stationary casing means to said moveable casing means so that when said actuator is in an actuated position, a floating system is formed of said actuator, said moveable casing means, said longitudinal element, said hollow spindle means, said disc support means, said disc clamp element, and said first resilient means.

2. The bearing unloading mechanism of claim 1 wherein said first resilient means comprises a main compression spring.

3. The bearing unloading mechanism of claim 1 wherein said disc clamping element comprises a dome-like, radially-expandable rubber clamp.

4. The bearing unloading mechanism of claim 1 wherein said disc clamping element comprises radially-expandable mechanical clamping jaws.

5. The bearing unloading mechanism of claim 1 wherein said longitudinal element comprises a pulling rod with a flange at its end opposite to said disc clamping element, and wherein said first resilient means comprises a compression spring positioned between said flange and said hollow spindle means.

6. The bearing unloading mechanism of claim 1 wherein said actuator comprises a hydraulic piston and a cylinder.

7. The bearing unloading mechanism of claim 1 wherein said stationary casing means has an abutment flange, said moveable connection means comprises an inner flange and second resilient means between said inner flange and said stationary casing means, the force developed by said first resilient means substantially exceeding the force developed by said second resilient means, said second resilient means normally tending to connect said moveable casing means to said stationary casing means.

8. A bearing unloading mechanism for a rigid disc clamping unit, comprising:
   a stationary casing;
   a hollow spindle rotatably mounted in said stationary casing;
   a disc support on said hollow spindle;
   a disc clamping element;
   a longitudinal rod slidingly arranged in said hollow spindle and attached to said disc clamping element;
   a first compression spring positioned between said hollow spindle and said longitudinal rod, said first spring normally urging said longitudinal rod in a direction such that said attached disc clamping element is urged to said disc support;
   a moveable casing;
   a linear actuator rigidly attached to said moveable casing, said linear actuator having a working element engaging said longitudinal rod so that when said actuator is in an actuated position, it overcomes the force of said first spring and releases said disc clamping element from said support; and
   moveable connector means moveably connecting said stationary casing to said moveable casing so that a floating system is formed of said actuator, said moveable casing, said longitudinal element, said hollow spindle, said disc support, said disc clamp element, and said first compression spring.

9. The bearing unloading mechanism of claim 8 wherein said disc clamping element comprises a dome-like, radially-expandable rubber clamp.

10. The bearing unloading mechanism of claim 8 wherein said disc clamping element comprises radially-expandable mechanical clamping jaws.

11. The bearing unloading mechanism of claim 8 wherein said longitudinal rod has a flange at its end opposite to said disc clamping element, and wherein said first compression spring is positioned between said flange and said hollow spindle.

12. The bearing unloading mechanism of claim 8 wherein said linear actuator comprises a hydraulic piston and a cylinder.

13. The bearing unloading mechanism of claim 8 wherein said stationary casing has an abutment flange thereon, and wherein said moveable connector means comprises an inner flange and second resilient means between said inner flange and said stationary casing, the force developed by said first resilient means substantially exceeding the force developed by said second resilient means, said second resilient means normally tending to connect said moveable casing to said stationary casing.

* * * * *